US006214964B1

(12) United States Patent
Ryan

(10) Patent No.: US 6,214,964 B1
(45) Date of Patent: Apr. 10, 2001

(54) PHENOL FORMALDEHYDE RESINS

(76) Inventor: Barry William Ryan, P.O. Box 511, Southport QLD 4215 (AU)

( * ) Notice: Subject to any disclaimer, the term of this patent is extended or adjusted under 35 U.S.C. 154(b) by 0 days.

(21) Appl. No.: 09/506,648

(22) Filed: Feb. 18, 2000

Related U.S. Application Data

(63) Continuation of application No. PCT/AU98/00665, filed on Aug. 19, 1997.

(30) Foreign Application Priority Data

Aug. 19, 1997 (AU) .................................................. PO8671

(51) Int. Cl.[7] .................................................. C08G 14/02

(52) U.S. Cl. .......................... 528/129; 521/181; 528/137; 528/142; 528/143; 528/144; 528/147

(58) Field of Search .................................... 528/129, 137, 528/142, 143, 144, 147; 521/181

(56) References Cited

U.S. PATENT DOCUMENTS 5,470,924 11/1995 Ryan .................................... 525/501

FOREIGN PATENT DOCUMENTS 2 102 820 2/1983 (GB) .

*Primary Examiner*—Morton Foelak
(74) *Attorney, Agent, or Firm*—Akin, Gump, Strauss, Hauer & Feld, L.L.P.

(57) ABSTRACT

A process for forming a phenol formaldehyde resin, the process comprising the steps of: (i) reacting phenol with an excess of a formaldehyde material in the presence of an acid or base catalyst until water separates from the reactants as an immiscible layer; (ii) adding a mixture comprising an excess of polyhydric alcohol and an aromatic dicarboxylic or tricarboxylic acid, salt or anhydride thereof to the phenol and formaldehyde reaction mixture followed by addition of an alpha hydroxy acid; (iii) adding a non-aqueous solvent, wherein at least some of said water is removed either before addition of the mixture preparated in step (ii) or after addition of the alpha hydroxy acid; (iv) preparing a solution comprising a Lewis acid, a polyhydric alcohol, an alpha hydroxy acid, a non-aqueous solvent, an aromatic sulphonic acid and sulphuric or hydrochloric acid; (v) adding the solution formed in step (iv) to the mixture formed in step (ii) and allowing the mixture to cure.

19 Claims, No Drawings

PHENOL FORMALDEHYDE RESINS

CROSS REFERENCE TO RELATED APPLICATION

This application is a continuation of International Application No. PCT/AU98/00665, filed Aug. 19, 1998.

FIELD OF THE INVENTION

The present invention relates to phenol formaldehyde resins and a process for making the resins. In particular, the present invention is directed towards phenol formaldehyde resin having a relatively high formaldehyde to phenol ratio when compared with conventional resins.

BACKGROUND ART

Phenol formaldehyde resins are known. These resins are typically made by condensing phenol with formaldehyde in the presence of a basic or acidic catalyst. The product resin comprises a crosslinked network of phenyl rings connected by methylene bridges. The molecular weight and degree of crosslinking of the resin may be increased by increasing the amount of formaldehyde. Molecular weight and degree of crosslinking can influence physical properties such as heat and flame resistance and mouldability. However, there is a practical limitation to the amount of formaldehyde which can be used. At a formaldehyde phenol ratio of above about 2:1, the rate of the crosslinking reaction is difficult to control and is considered too reactive for commercial resin production. For this reason, the maximum ratio of formaldehyde in conventional resins is about 1.5:1.

In an earlier patent application No. WO 92/1758 a phenol formaldehyde resin having a relatively high formaldehyde ratio is described. This resin is prepared by mixing two separate phenol formaldehyde mixtures. A first resole is prepared by mixing phenol and excess formaldehyde in the presence of a basic catalyst. After a period of time, a stabiliser comprising glycerol and a dicarboxylic acid is added to control further reaction. Water is then removed under vacuum and methanol as solvent is added. Water is generally present in the reactants and is also produced by the condensation reaction between phenol and formaldehyde. The second resole is prepared by mixing phenol and formaldehyde in the presence of an acidic catalyst. In this case, only a marginal excess of formaldehyde is used. After the phenol and formaldehyde have reacted, water is removed under vacuum and a solution comprising zinc chloride, an alpha hydroxy acid, p-toluene sulphonic acid and sulphuric acid in a non-aqueous solvent is then added. To produce the product resin, an excess of the first mixture is mixed with the second mixture and the final mixture is allowed to cure.

The above process is essentially a two pack method for preparing a phenol formaldehyde resin. This method requires the preparation of two different types of resole, each resole being prepared under different catalytic conditions. The method also requires separate storage of each component until use.

It is an object of the present invention to provide a one step method for the preparation of a phenol formaldehyde resin having formaldehyde in excess or to provide the public with a useful choice.

SUMMARY OF THE INVENTION

According to a broad form of the present invention there is provided a process for forming a phenol formaldehyde resin, the process comprising the steps of;

(i) reacting phenol with an excess of a formaldehyde material in the presence of an acid or base catalyst until water separates from the reactants as an immiscible layer, (ii) adding a mixture comprising an excess polyhydric alcohol and an aromatic dicarboxylic or tricarboxylic acid, salt or anhydride thereof to the phenol and formaldehyde reaction mixture followed by addition of an alpha hydroxy acid, (iii) adding a non-aqueous solvent, wherein at least some of said water is removed either before addition of the mixture prepared in step (ii) or after addition of the alpha hydroxy acid, (iv) preparing a solution comprising a Lewis acid, a polyhydric alcohol, an alpha hydroxy acid, a non-aqueous solvent, an aromatic sulphonic acid and sulphuric or hydrochloric acid, (v) adding the solution formed in step (iv) to the mixture formed in step (iii) and allowing the mixture to cure.

According to a second broad form of the invention there is provided a phenol formaldehyde resin prepared by the process of the first broad form.

The present invention is based upon the surprising and unexpected discovery that a phenol: formaldehyde resin containing a high formaldehyde ratio can be prepared in a one step method.

In the present specification and claims, the term formaldehyde material includes formaldehyde and formaldehyde precursors which generate free formaldehyde in situ. Examples of such formaldehyde precursors include paraformaldehyde and hexamethylene tetramine. Preferably a mixture of paraformaldehyde and formaldehyde is used.

In the present specification and claims, the term phenol includes phenol, phenol derivatives and mixtures thereof. Typical phenol derivatives include cresol, resorcinol, xylenol, bisphenol A and p-t-butylphenol.

In the method of the present invention phenol is reacted with an excess of a formaldehyde material. Preferably the formaldehyde phenol ratio is between about 2:1 to about 3:1. Preferably the ratio is about 2.5:1.

The phenol and formaldehyde material are reacted in the presence of an acid or base catalyst. Any suitable catalyst may be used and these are known in the art. Preferably a basic catalyst is used. Typical catalysts include sodium hydroxide, calcium hydroxide, potassium hydroxide, sodium carbonate or organic amines.

The phenol and formaldehyde reactants are initially soluble in water. As the condensation reaction proceeds, the product become less soluble in water. After a period of time, an immiscible aqueous layer is formed. The reaction between the phenol and formaldehyde is allowed to proceed until formation of a separate aqueous layer. When this occurs, a stabiliser comprising a polyhydric alcohol and an aromatic dicarboxylic or tricarboxylic acid salt or anhydride thereof is added. The polyhydric alcohol is preferably a lower alkyl diol or triol. Suitable alcohols include glycerol, 2,3 butanediol, 1,3 propanediol, meso-hydroxybenzoin, ethylene glycol, pinacol, pentaerthyritol and 1,3-butanediol. Glycerol is a particularly preferred alcohol.

The aromatic dicarboxylic or tricarboxylic acid may include phthalic acid, isophthalic acid, trimellitic acid or trimesic acid. Particularly preferred is phthalic acid. Anhydrides of these acids may also be used and are preferred. An especially preferred anhydride is phthalic anhydride.

The polyhydric alcohol and acid or anhydride are preferably mixed prior to addition to the phenol formaldehyde mixture. The mixture contains an excess of polyhydric alcohol and typically comprises an alcohol acid molar ratio of between about 9:1 to about 22:1 based on the hydroxyl groups. The polyhydric alcohol and acid or anhydride may react to form an ester having free hydroxyls. These hydroxyls are available when a basic catalyst has been used, the alcohol/dicarboxylic acid mixture may neutralise the base. The alcohol/anhydride mixture may also react with hydroxy or carboxyl groups in the reaction mixture to form a condensation product. An especially preferred alcohol/anhydride mixture is glycerol and phthalic anhydride. Preferably the glycerol/phthalic anhydride mixture is in a weight ratio of about 5:1. Preferably about 3.5 wt % to about 4 wt % of the glycerol/phthalic anhydride based on phenol is added to the phenol/formaldehyde mixture.

After addition of the stabiliser, an alpha hydroxy carboxylic acid is added. Examples of suitable alpha hydroxy acids include lactic acid, glycolic acid, citric acid, mandelic acid and malic acid. Lactic acid is particularly preferred. When the phenol and formaldehyde have been reacted in the presence of a basic catalyst, the acid may also neutralise the base. Typically, about 0.05 to about 3 wt % of acid is added. (Based on the total amount of phenol and formaldehyde). Preferably, about 1 to about 1.5% is added.

At least some of the water is removed from the reactant mixture either before or addition of the mixture formed in step (iii). Preferably substantially all the water is removed. The water may be removed by any suitable means. The reactants may be allowed to stand for a period of time to allow the layers to separate. The upper aqueous layer may then be removed by known separation techniques such as decanting. Typically where the mixture is allowed to stand the stabiliser is added before the standing.

Alternatively, the water may be removed by vacuum. In a preferred form of the invention the water may be removed during the later part of the reaction between the phenol and formaldehyde. In this case the stabiliser prepared in step (iii) will typically be added after water removal.

A non-aqueous solvent is then added to the reaction mixture. Generally the type and amount of solvent is selected to obtain a desired viscosity of the solution. Suitable solvents are known to persons skilled in the art. Preferred solvents include methanol, dipropylene glycol, polyethylene glycol, methylene chloride, diethylene glycol or mixtures thereof.

In an especially preferred form of the present invention a material which can provide additional methylene bridges may be added to the stabilized mixture. A preferred methylene donor is furfural or furfurol. The methylene donor may be added in an amount of up to about 30 vol %.

The reaction mixture comprising the phenol formaldehyde reactants and stabiliser may be classified as an A-stage resole resin. A-stage resins are phenol formaldehyde resins which are soluble in organic solvents and essentially comprise partially condensed phenol alcohols. Curing of the stabilized resole of the present invention is initiated by addition of an acidic catalyst comprising a Lewis acid, a polyhydric alcohol, an alpha hydroxy acid, an aromatic sulphonic acid and sulphuric or hydrochloric acid.

The relative amounts of the components in the acidic catalyst may influence cure rate and gell time and may be varied as desired.

The Lewis acid may include zinc chloride, tin chloride, aluminium chloride or a mixture thereof. Especially preferred is zinc chloride.

The polyhydric alcohol may include any one or more of the alcohols listed above. Glycerol is a preferred alcohol. The aromatic sulphonic acid may include p-toluene sulphonic acid, sulphonic acid and derivatives or mixtures thereof.

The alpha hydroxy acid may include those alpha hydroxy acids listed above. A preferred acid is lactic acid.

The solution preferably also includes a non-aqueous solvent. Preferred solvents are lower alkyl alcohols and methanol is particularly preferred. The methanol can act both as a solvent and reactant.

Preferred catalyst solutions may comprise about 20 to 26 parts by volume solvent, about 12 to about 20 parts by volume sulphuric acid, about 2.8 to about 4,5 parts by volume lactic acid, about 2 to about 35 parts by volume glycerol, about 0.075 to about 0.4 parts by weight zinc chloride and about 30 to about 40 parts by weight p-toluene sulphonic acid.

In a particularly preferred embodiment of the present invention a foaming agent and a surfactant is added after addition of the catalyst. Suitable foaming agents and surfactants are known to those skilled in the art. Carbonates such as calcium carbonate may be used as foaming agents. Preferred foaming agents and surfactants include those available under the trade name 141A, UL5440, DC193 and DC190.

BEST MODE

By way of example only, a preferred embodiment of the present invention will now be described as follows:

A reactor is charged with phenol (5.4 kg) and a 37% solution of formaldehyde (6 kg). Sodium hydroxide (0.177 kg of a 50% solution) is then added. The temperature rises as the reaction progress. The rate of temperature increase is suitably no more than 3° C. per minute. The temperature is controlled by condensers and cooling coils and the maximum temperature is about 95° C.

The reactants are initially soluble in water. As the reaction proceeds, the condensation product becomes less water tolerant and two immiscible layers are eventually formed. The progress of the reaction may therefore be monitored by determining the water tolerance of the reaction mixture.

Early in the reaction, additional water may be added to a sample of the reaction mixture to observe how much water is required before the mix becomes cloudy at 25° C. As the reaction proceeds, there comes a time when no water needs to be added as the reaction mixture is already cloudy. Typically a small sample of about 10 g is withdrawn from the reactor and cooled to 25° C. Water at 25° C. is then added until the sample becomes cloudy. The amount of water added is noted and the weight or volume is taken as the tolerance. For example, if 8 gm of water turns 10 gm of sample cloudy, the tolerance is referred to as 0.8 to 1.

As the solubility of the resin in water changes with temperature, the progress of the reaction can also be followed by measuring the cloud temperature. The cloud point is the temperature at which the reaction mixture becomes cloudy. A cloud temperature of 25° C. corresponds to a water tolerance of 0.

In order to test the cloud point, a log samples is typically withdrawn from the reactor and cooled with stirring until it becomes cloudy. The temperature at which this is occurs is recorded as the cloud point.

When the water tolerance is 0 or the cloud point is 25° C. a glycerol phthalic anhydride mixture (0.21 kg) is added to the reactor. The ratio of glycerol to phthalic anhydride in this mixture is about 5:1. The mixture is prepared by mixing the two reactants and heating. The temperature of the reaction mixture is allowed to cool to about 80°. Lactic acid (0.176 kg) is then added. The resin mixture in the reactor is drawn off and allowed to stand in tanks for about 3 to 6 hours.

During this time water in the mixture separates as an upper layer. The water is then removed by decanting. Immediately after removal of the water a non aqueous solvent (0.9 kg) comprising diethylene glycol, dipropylene glycol, polyethylene glycol, ethanol, methanol, methylene chloride or a mixture of any two or more thereof is added. The formaldehyde content of the decanted water is tested and adjusted by adding paraformaldehyde to the equivalent of a 37% formaldehyde solution. This solution can then be recycled to the reactor.

Alternatively the water may be removed under vacuum. This may be preferred when preparing large batches in which decanting may not be practical. Typically, after about the first hour of reaction between the phenol and formaldehyde the mixture is held at about 90° and vacuum applied. As an alternative to constantly monitoring the cloud point to ascertain when the reaction end-point has been achieved, the end-point may be determined by measuring the refractive index of the mixture. The refractive index varies with water content. The desired refractive index may be determined by pilot scale tests by using the water tolerance tests as described above. When the desired refractive index has been achieved, the vacuum is turned off and the mixture cooled. The glycerol anhydride and lactic acid are then added as described above. Excess formaldehyde may be removed by adding ammonia solution. The pH of the solution may be adjusted to about 4.5 if necessary by adding an acid, typically lactic acid.

If desired up to about 30 vol % furfural or furfurol may be added to the resin mixture on cooling. The furfural or furfurol react during curing to form additional methylene crosslinks. The amount of furfural or furfurol added may be varied depending upon the desired degree of crosslinking in the final product.

The resin mixture may then be stored until desired. The mixture has a storage life of between 3 to 5 years under refrigeration. Conventional resins when stored under similar conditions typically have a shelf life of only 2 to 3 months.

The acidic catalyst solution is prepared by mixing the ingredients in the desired ratios. Generally when a relatively fast curing rate is desired, for example in the production of foams the catalyst has a relatively low ratio of sulphonic acid to sulphuric acid. A typical ratio is about 1.5. In situations where a slower rate of curing is desired to allow for a longer working time before cure, such as in the preparation of laminates, the ratio may be about 3.5 to about 4.5 and typically about 3.75. A typical catalyst mix for use in producing laminates is prepared by mixing p-toluene sulphonic acid (7.555 kg), zinc chloride (0.070 kg), sulphuric acid (2.014 kg), lactic acid (0.673 kg) and glycerol (0.355 kg) in methanol (3.587 kg). A typical catalyst suitable for a foam mixture may be formulated with additional sulphuric acid (3.k) in 5.k methanol.

If desired, fillers may optionally be added to the resin mixture before the catalyst is added. Typical fillers include cellulose products such as mica, woodflour, cotton flock, chopped rags, fiberglass, nitrile rubbers and microballoons. Typically about 25 to about 70% of filler may be added.

The resin of the present invention may also be used to coat substrates such as fiberglass. Typically the resin is applied to the substrate by roller or the like immediately after mixing with the catalyst.

A foamed material may be obtained by adding a foaming agent and/or surfactant to the mixture before the catalyst has been added. Such foamed material may be used as a fire resistant insulation material. The material may also be used for acoustic insulation.

Phenol formaldehyde resins made according to the process of the present invention have a higher degree of flame resistance when compared to conventional resins. These resins may also be prepared by a simple one step method as compared to more expensive and complicated two pack methods. Still further, the resole displays surprising stability and may be kept under refrigeration for a number of years.

It should be appreciated that various other changes and modifications may be made to the embodiment described and claimed without departing from the spirit and scope of the invention.

What is claimed is:

1. A process for forming a phenol formaldehyde resin, the process comprising the steps of;

(i) reacting phenol with an excess of a formaldehyde material in the presence of an acid or base catalyst until water separates from the reactants as an immiscible layer, (ii) adding a mixture comprising an excess of a polyhydric alcohol and an aromatic dicarboxylic or tricarboxylic acid, salt or anhydride thereof to the phenol and formaldehyde reaction mixture followed by addition of an alpha hydroxy acid, (iii) adding a non-aqueous solvent, wherein at least some of said water is removed either before addition of the mixture prepared in step (ii) or after addition of the alpha hydroxy acid, (iv) preparing a solution comprising a Lewis acid, a polyhydric alcohol, an alpha hydroxy acid, a non-aqueous solvent, an aromatic sulphonic acid and sulphuric or hydrochloric acid, (v) adding the solution formed in step (iv) to the mixture formed in step (ii) and allowing the mixture to cure.

2. The process of claim 1, wherein the molar ratio of formaldehyde to phenol is between about 2:1 to about 3:1.

3. The process of claim 2, wherein the formaldehyde material comprises paraformaldehyde and formaldehyde.

4. The process of claim 1, wherein the phenol is reacted in the presence of a basic catalyst selected from the group consisting of, sodium hydroxide, calcium hydroxide, potassium hydroxide, sodium carbonate an organic amine or a mixture thereof.

5. The process of claim 1, wherein the polyhydric alcohol in the mixture added in step (ii) is selected from the group consisting of glycerol, 2,3 butanediol, 1,3 propanediol, meso-hydroxybenzoin, ethylene glycol, pinacol, pentaerthyritol, 1,3-butanediol or a mixture thereof.

6. The process of claim 5, wherein the aromatic dicarboxylic acid is selected from the group consisting of phthalic anhydride, isophthalic acid, trimellitic acid, trimesic acid or a mixture thereof.

7. The process of claim 5, wherein the molar ratio of polyhydric alcohol to acid or anhydride ratio is between about 9:1 to about 22:1 based on hydroxyl groups.

8. The process of claim 7, wherein the polyhydric alcohol is glycerol and the anhydride is phthalic anhydride in a weight ratio of between about 4:1 to about 6:1.

9. The process of claim 8, wherein about 3.5 wt % to about 4.5 wt % of the glycerol/anhydride mixture is added to the mixture formed in step (i).

10. The process of claim 1, wherein the alpha hydroxy acid is selected from the group consisting of lactic acid, glycolic acid, citric acid, mandelic acid, malic acid or a mixture thereof.

11. The process of claim 1, wherein a methylene donour is added to the mixture formed in step (ii) or step (iii).

12. The process of claim 11, wherein the methylene donour is furfural or furfurol and is added in an amount of up to about 30 vol %.

13. The process of claim 1, wherein the mixture formed in step (iii) is stored before the solution formed in step (iv) is added.

14. The process of claim 1, wherein the Lewis acid is selected from the group consisting of zinc chloride, tin chloride, aluminium chloride or a mixture thereof.

15. The process of claim 14, wherein, the solution formed in step (iv) comprises about 0.075 to about 0.4 parts by weight zinc chloride, about 2 to about 45 parts by volume glycerol, about 2.8 to about 4.5 parts by volume lactic acid, 20 to about 26 parts by volume solvent, about 30 to about 40 parts by weight p-toluene sulphonic acid and about 12 to about 20 parts by volume sulphuric acid.

16. The process of claim 1, wherein a foaming agent is added before the addition of the solution formed in step (iv).

17. The process of claim 16, wherein the aromatic sulphonic acid is p-toluene sulphonic acid and the ratio of sulphonic acid to sulphuric acid is between about 1.4 to about 1.6.

18. The process of claim 1, wherein the aromatic sulphonic acid is p-toluenesulphonic acid and the ratio of p-toluene sulphonic acid to sulphuric acid is between about 3.5 to about 4.5.

19. The process of claim 1, wherein a filler is added before the addition of the solution prepared in step (iii).

* * * * *